UNITED STATES PATENT OFFICE.

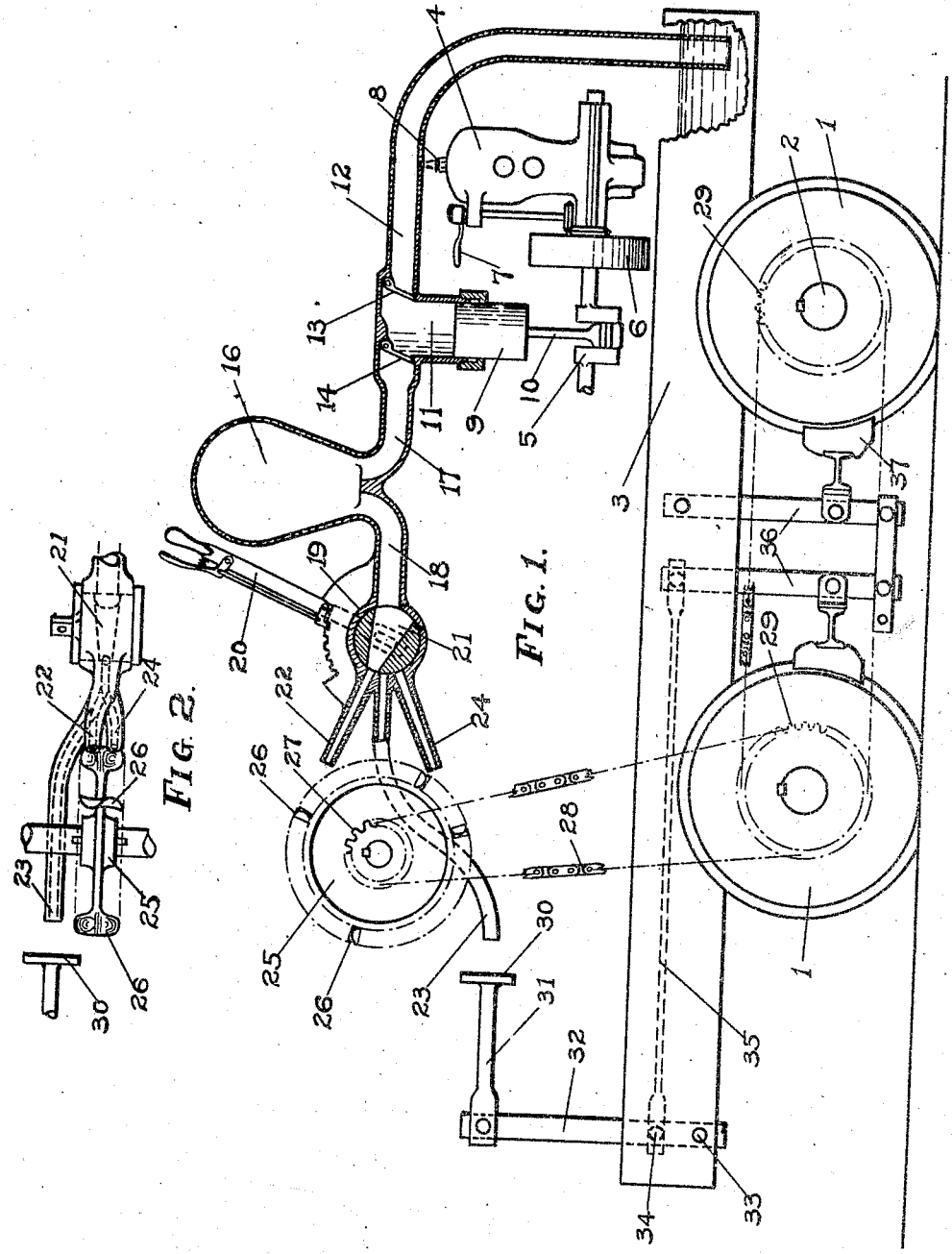

REGINALD N. LOWRY, OF SEWICKLEY, PENNSYLVANIA.

LOCOMOTIVE.

1,027,424.  Specification of Letters Patent.  Patented May 28, 1912.

Application filed April 15, 1911. Serial No. 621,347.

*To all whom it may concern:*

Be it known that I, REGINALD N. LOWRY, a citizen of the United States of America, residing at Sewickley, in the county of Allegheny and State of Pennsylvania, have invented a new and useful Improvement in Locomotives Propelled by Internal-Combustion Engines, of which the following is a specification.

My invention relates to improvements in locomotives or vehicles which are propelled by internal combustion engines, such as automobiles, traction engines, railway cars and the like.

The object of my invention is to provide a means for doing away with the clutch, reverse gears and change speed gears now in universal use and which will more perfectly perform all the desirable functions of the said clutch and gears, at the same time having new and desirable functions of its own.

The present clutch and gear arrangement is satisfactory on passenger and light freight automobiles but is not practical or adaptable to heavier work. The inertia and momentum of the lighter vehicle is very small compared with that of locomotives, heavy freight automobiles or traction engines and it is therefore practical to control the former vehicles with clutch and gears, but with the latter vehicle the inertia and momentum, especially when hauling other vehicles, is enormous and would require a clutch and gear device of impractical proportions.

My invention consists in the novel manner of inserting a fluid and fluid actuating device in the transmission system as shown on the accompanying diagrammatical drawing.

On the drawing I show a diagram only which clearly illustrates the principle of my invention, the proportion, position and minor details being sacrificed to make the drawing more easily understood.

Figure 1 is a side elevation of the locomotive. Fig. 2 is a plan view of the nozzle.

Figure 1 is a side elevation of a locomotive having driving wheel 1 mounted on axles 2 with a frame 3 provided with a fluid reservoir. The cylinder 4, crank shaft 5, fly wheel 6, ignition timer 7 and spark plug 8, all indicate the internal combustion engine for generating the motive power. The piston 9 with its connecting rod 10, working in the pump casing 11, transmits the power developed by the engine to the fluid contained in the reservoir of the frame 3, the downward movement of the piston 9 drawing the fluid through pipe 12 and check valve 13, into the case 11; the upward movement closing check valve 13 and forcing the fluid through check valve 14, into pressure chamber 16 through pipe 17. In pressure chamber 16 the pulsations of the pump are rectified and the fluid is delivered to pipe 18 is a steady stream. When a constant delivery pump, such as a rotary or centrifugal pump, is used the pressure chamber 16 can be done away with, its only object being to secure a steady stream of the fluid such as is delivered by the latter class of pumps. From pipe 18 the fluid passes to the three-way-cock 19, with its plug 21, which is actuated by hand lever 20, the port in the plug being larger at the intake end than at the delivery end, so that for all allowed positions of hand lever 20, there is a full opening from pipe 18 into plug 21. The three-way-cock 19 is provided with three nozzles 22, 23 and 24, the intake ends being close together and arranged so that the port of plug 21 can deliver into any one of them or partly into either of the two adjacent ones but not into all three at the same time and never into less than one of them. The bore of the nozzles 22, 23 and 24 is smaller than that of the pipes 12, 17 or 18, thereby increasing the velocity with which the jet of fluid is discharged from the nozzles. The rotor or wheel 25, is located in the path of the jets from nozzles 22 and 24, provided with buckets 26, arranged so that the jet from 22 will revolve the rotor in one direction while the jet from 24 will revolve the rotor in the opposite direction. It is of great importance to maintain a line of travel for the fluid from the pumps to the buckets 26 in as straight a line as possible, any bends or curves in this line of travel make a material reduction in the efficiency by offering resistance to the passage of the fluid, it will be seen from the drawing that a straight travel has been provided for as far as possible, the only departure being necessary in order to eject the jets tangent to the path of the buckets 26 at points on different sides of the center of rotation. On vehicles intended to travel mainly in one direction the fluid can be directed in a straight line clear to the bucket, the pipe carrying the fluid for propelling the vehicle in the opposite direction can contain all the curves and deflections thereby in creasing the efficiency in one direction at the expense of the opposite direction. The nozzles may be curved at their delivery ends so as to deliver the jets parallel with each other. The rotor 25, is connected to the sprocket wheel 27 in mesh with sprocket chain 28, which is in turn in mesh with sprocket wheel 29, attached to driving wheel 1, etc. The nozzle 23 passes out around the rotor 25, and delivers its jet against the face 30 of a push bar 31, connected to brake lever 32, fulcrumed to the frame 3 at 33, connected at 34 to the pull rod 35 actuating levers 36 and forcing brake shoes 37 against the wheels 1. This brake has been made the object of a separate application.

In Fig. 2, is a plan view of the nozzles which shows that the nozzle 23 passes around the rotor 25 and also shows that nozzles 22 and 24 are not in the same vertical plane thus allowing two sets of buckets to be used on the rotor 25, each set of buckets having their working or concave faces arranged to receive their respective jets.

The operating of a locomotive equipped with my improvement as above described is as follows: The hand lever 20 is thrown to brake position thereby bringing port in valve stem 21 opposite nozzle 23, the internal combustion engine is next started in the usual way; although the engine is directly connected to the pump this feature will not offer any appreciable resistance to the hand work or cranking, cranking is done at a very slow speed compared with the running speed of the engine and therefore the pump does practically no work at all, offering very little resistance. When the engine commences to run its load begins to apply itself; as the speed increases the load increases until at full speed the engine is under full working load, this load remaining constant regardless of the working of the locomotive, no matter whether the locomotive is standing still, starting, stopping, moving fast or slow or stalling on a heavy grade, the load on the engine does not vary and its revolutions remain constant and always maximum, which is absolutely necessary to get the full power of the engine, the power decreasing in direct proportion with any decrease in number of revolutions. The reason for this is that the load is not imposed by the driving wheels 1, but by the restricted bore of the nozzles; the pump delivers a certain fixed quantity of liquid all of which must pass through the nozzles as fast as delivered by the pump, this requires a much greater velocity of flow in the smaller bore and the effort necessary to accelerate the fluid to the required velocity constitutes the load on the engine. The work done in accelerating the fluid is not lost but is stored in the jet in the form of kinetic energy and is transferred directly to the rotor 25 by the impingement of the jet on the buckets 26, or else to the brakes by the impingement of the jet from nozzle 23 on face 30 of push bar 31.

An open space is provided between the ends of nozzles 22 24 and the buckets 26 on the rotor 25 thus preventing the buckets 26 from backing up the fluid or offering resistance to the discharge of the fluid from the nozzles. The resistance of the buckets 26 to the jet varies considerably depending upon the amount of work the locomotive has to do and it will therefore be seen that if the path of the fluid was incased with the buckets that the fluid would have to transmit the varying resistances of buckets 26 back through the pumps to the engine thus varying the speed of the engine and causing fluctuations in its power which is very objectionable. The open path I provide for the jet allows the jet to deflect or splash to the side after it has expended its energy on the buckets, it is therefore impossible for the varying resistance or speed of the buckets to restrict or relieve the spouting resistance of the fluid at the discharge ends of the nozzles, this allows the pump and engine to run under a non-fluctuating load, the varying resistances of the buckets only affect the amount of splash or side deflection of the jet. The open space or gap between the nozzles and the buckets constitutes a load regulating means, the portion of fluid which crosses this gap is not confined in any way, it maintains its form and direction from its own momentum and has been herein referred to as a jet. After the jet has spent its energy on the buckets of the rotor 25 the fluid of which it was composed falls by gravity back into the fluid reservoir in the frame 3 which supplies the pump, the same fluid being used over and over again thus making it practical for the locomotive to carry its own supply of fluid for the transmission.

With the engine running and the hand lever in brake position the locomotive is standing still with brakes applied. To release the brake and start in either direction it is only necessary to move the lever either to the right or to the left according to the direction desired,—this releases the brake and gradually brings a jet of the fluid at high velocity against the buckets on the rotor. The rotor being motionless, the gross velocity of the jet is felt and the resulting torque is much greater than when in motion at which time the buckets are traveling in the same direction as the jet and therefore only the net velocity, or difference in velocity between buckets and jet would be effective and the torque would be less. In both cases the work or foot-pounds or product of force times velocity is the same; in starting the velocity is small and hence the force is great, which is the ideal condition to overcome starting resistance and inertia. As the speed increases the force decreases in proportion. To reverse the direction of the locomotive the hand lever is moved back to brake position which applies the brake, as soon as the locomotive comes to a standstill the movement of the lever is continued past brake position, the brakes release and the jet comes from the opposite nozzle and rotates the wheels in the opposite direction. Should the operator desire to make an emergency stop the lever can be moved clear over past the brake position and the opposite jet will exert a high retarding torque, the buckets being forced against the jet by the driving wheels of the locomotive will produce the same effect as though the jet had been increased in velocity by an amount equal to the velocity of the buckets.

The speed can be controlled with the hand lever only by allowing only a portion of the fluid to go to the buckets, the balance being discharged through the brake nozzle. This is not the most economical way of controlling speed but is very convenient when in a dangerous position or obstructed right of way, as it holds the full power of the engine, ready for instant effort in response to the hand lever only. When considered advisable, the speed can be controlled by throttling or otherwise slowing the engine down as at present.

It will be seen from the above that my fluid device performs all of the functions of the present friction clutches in making and breaking the driving connection between the engine and the driving wheels, and allowing the engine to be cranked for starting without the resistance of the load. It will also be seen that my device has the following advantages over the friction clutch: 1st. It does not have a rubbing or friction surface to wear out rapidly. 2nd. It does not require a separate hand lever to operate it, as it is operated by the same lever that controls the speed and direction. 3rd. It does not have to be thrown into operation with such rapidity as to make the whole locomotive jump but can be brought into action as slowly as desired, imparting an even acceleration and not racking the machinery. 4th. It never allows the engine to race and maintains under all conditions a constant load on the engine. 5th. It allows the operator to adjust the engine to its best running condition while under full load and while the locomotive is standing still. 6th. It has a greater loading capacity. 7th. The wear is less.

My fluid device performs all the functions of the reversing gears as it allows the operator to run the locomotive in either direction without reversing the engine. My device has the following advantages over the reversing gears: 1st. It is impossible to wreck the machinery by trying to bring the reversing power into operation while the locomotive is running at high speed. 2nd. By moving the hand lever slowly to reverse position, while the locomotive is running at full speed, an even retarding force is produced, the whole power of the engine being used to stop, start and accelerate in the opposite direction; the whole operation being performed with a smooth and agreeable effort, not jumping or racking the machinery. 3rd. The efficiency is greater. 4th. The wear is less. 5th. The loading capacity is greater. 6th. It does not require a separate hand lever to operate, as it is operated by the same lever that controls the speed.

My fluid transmission gives full control of the speed and in addition has the following advantages over the usual change speed gears: 1st. It has an infinite number of ratios, instead of only three or four ratios. 2nd. It is self adjusting, allowing the speed of the locomotive to automatically decrease as the resistance increases and vice versa; as the speed decreases, the torque or pull increases, maintaining under all conditions the same work unit or product of force times speed. 3rd. It has no minimum or maximum speeds, below or above which the speed of the engine is affected; the speed of the engine remaining constant under all conditions. 4th. It does not allow the speed of the locomotive to change the speed of the engine. The locomotive can climb a grade of increasing pitch until it reaches a point where the gravity resultant equals the power of the engine, at which point the locomotive will stop, but the engine will be turning up its full number of revolutions and therefore delivering its full power to the driving wheel. just balancing the gravity resultant tending to pull the locomotive down the grade. 5th. The efficiency is greater. 6th. The load capacity is greater. 7th. The wear is less.

It will be appreciated that the construction illustrated on the drawing and described on the foregoing specification is but one expression or application of the principle of my invention, that the construction or mechanism illustrated may be varied or modified without departing from the principle, and that my invention may be used on vehicles analogous to locomotives. It is obvious that a rotary or centrifugal fluid pump can be used in place of the piston pump shown, that a turbine rotor instead of a bucket rotor can be used, that a direct shaft drive can be used instead of the sprockets and sprocket chains, that changes can be made to suit either gas or liquid, etc., without departing from my invention and claims.

What I claim as my invention and desire to have covered by Letters Patent is:—

1. A locomotive propelled by an internal combustion engine, by means of a fluid transmission, the fluid operating a rotor by impacting against the rotor in a jet from any of a plurality of diverging nozzles.

2. A locomotive propelled by an internal combustion engine, by means of a fluid forced by said engine in a jet through any one or more of a plurality of diverging nozzles against a rotor and means for transmitting power from the rotor to the driving wheels.

3. In a locomotive propelled by an internal combustion engine, the combination of an internal combustion engine, a fluid forced by the engine, a plurality of diverging nozzles adapted to eject the fluid in a jet, and a means for directing the fluid to the different nozzles.

4. In a locomotive propelled by an internal combustion engine, a fluid forced by the engine, a plurality of nozzles adapted to eject the fluid in the same direction and at diverging angles and means for transmitting the power of the jets to the driving wheels.

5. In a locomotive propelled by an internal combustion engine, a fluid forced by the engine, a plurality of nozzles adapted to eject the fluid in jets in the same direction, a rotor in the path of the jets adapted to be rotated in either direction by the jets.

6. In a locomotive propelled by an internal combustion engine, the combination of an internal combustion engine, a fluid forced by the engine, a series of diverging nozzles through which the fluid is forced, a rotor in line with the nozzles adapted to receive and transmit power from the fluid ejected from the nozzles.

7. In a locomotive propelled by an internal combustion engine the combination of an internal combustion engine, a fluid forced by the engine a plurality of nozzles adapted to deliver the fluid in diverging jets, a rotor in the path of the jets adapted to receive power from the jets, and means for transmitting power from the rotor to the driving wheels.

8. In a locomotive propelled by an internal combustion engine, the combination of an internal combustion engine, a fluid forced by the engine, a plurality of nozzles adapted to deliver the fluid in diverging jets, a rotor in the path of the jets adapted to receive power from the jets the rotor having its axis within the angle of divergence of the jets and means for transmitting power from the rotor to the driving wheels.

9. In a locomotive propelled by an internal combustion engine, the combination of an internal combustion engine, a fluid forced by the engine, a plurality of nozzles adapted to deliver the fluid in diverging jets, a rotor in the path of the jets adapted to be rotated in either direction by the jets, and means for transmitting power from the rotor to the driving wheels.

REGINALD N. LOWRY.

Witnesses:
 ALICE A. TRILL,
 CARL SWARTZ.